(12) United States Patent
Sillon

(10) Patent No.: US 11,788,414 B2
(45) Date of Patent: Oct. 17, 2023

(54) METHOD FOR BALANCING THE OUT-OF-BALANCE OF A SHAFT/WHEEL ASSEMBLY

(71) Applicant: DATATECHNIC, Uxegney (FR)

(72) Inventor: Christophe Sillon, Mirecourt (FR)

(73) Assignee: DATATECHNIC, Uxegney (FR)

( * ) Notice: Subject to any disclaimer, the term of this patent is extended or adjusted under 35 U.S.C. 154(b) by 229 days.

(21) Appl. No.: 17/282,155

(22) PCT Filed: Oct. 1, 2019

(86) PCT No.: PCT/FR2019/052323
§ 371 (c)(1),
(2) Date: Apr. 1, 2021

(87) PCT Pub. No.: WO2020/070439
PCT Pub. Date: Apr. 9, 2020

(65) Prior Publication Data
US 2022/0003118 A1    Jan. 6, 2022

(30) Foreign Application Priority Data
Oct. 2, 2018   (FR) ................................. 1859134

(51) Int. Cl.
*F01D 5/02* (2006.01)
*G01M 1/24* (2006.01)
*G01M 1/34* (2006.01)

(52) U.S. Cl.
CPC ............. *F01D 5/027* (2013.01); *G01M 1/24* (2013.01); *G01M 1/34* (2013.01); *F05D 2220/40* (2013.01); *F05D 2230/10* (2013.01)

(58) Field of Classification Search
CPC ...... F01D 5/027; F05D 2230/10; G01M 1/24; G01M 1/34
See application file for complete search history.

(56) References Cited

U.S. PATENT DOCUMENTS 4,300,387 A * 11/1981 Okano ................. G01M 1/02
73/460
4,976,147 A * 12/1990 Okochi ................ G01M 1/04
73/455

(Continued)

FOREIGN PATENT DOCUMENTS

CN      114577398 A  *  6/2022
DE      112016001288      11/2017

(Continued)

OTHER PUBLICATIONS

International Search Report for PCT/FR2019/052323 dated Dec. 3, 2019, 4 pages.

*Primary Examiner* — Natalie Huls
(74) *Attorney, Agent, or Firm* — NIXON & VANDERHYE

(57) ABSTRACT

Disclosed is a method for balancing the out-of-balance of a shaft/wheel assembly. The balancing method involves a step of measuring the value of the out-of-balance of a wheel/shaft assembly with respect to a longitudinal axis of the mechanical shaft, and then measuring the position of at least two different target zones present on the surface of the wheel. The method involves removing material from the surface of the vaned wheel in order to reduce the value of the out-of-balance of the shaft/wheel assembly depending on the measurements taken in steps a) and b). In this way, the balancing method is much more precise compared with the prior art.

20 Claims, 3 Drawing Sheets

(56) References Cited

U.S. PATENT DOCUMENTS

| | | | | |
|---|---|---|---|---|
| 2015/0361993 | A1* | 12/2015 | An | F01D 5/027 |
| | | | | 416/61 |
| 2016/0363134 | A1* | 12/2016 | Seike | F04D 29/662 |
| 2018/0058971 | A1* | 3/2018 | Kataoka | F01D 5/027 |
| 2021/0215172 | A1* | 7/2021 | Roberts | G01M 1/34 |
| 2022/0339738 | A1* | 10/2022 | Matsushita | F01D 21/003 |

FOREIGN PATENT DOCUMENTS

| | | | | | |
|---|---|---|---|---|---|
| JP | | 2012037409 A | * | 2/2012 | |
| WO | WO-2021044022 A1 | * | 3/2021 | | F01D 5/027 |

\* cited by examiner

METHOD FOR BALANCING THE OUT-OF-BALANCE OF A SHAFT/WHEEL ASSEMBLY

This application is the U.S. national phase of International Application No. PCT/FR2019/052323 filed Oct. 1, 2019 which designated the U.S. and claims priority to FR Patent Application No. 1859134 filed Oct. 2, 2018, the entire contents of each of which are hereby incorporated by reference.

TECHNICAL FIELD TO WHICH THE INVENTION RELATES

The present invention relates to a method for balancing the out-of-balance of a shaft-wheel assembly, comprising a bladed wheel held at the end of a mechanical shaft. In particular, it relates to a method for balancing the out-of-balance of a turbocharger part for a heat engine, comprising a turbine wheel welded to the end of a mechanical shaft. The present invention also relates to an automated balancing station, adapted to implement the balancing method.

TECHNOLOGICAL BACK-GROUND

In a known manner, a turbocharger makes it possible to increase the efficiency of a heat engine. For that purpose, the turbocharger comprises a turbine wheel held at one end of a mechanical shaft and a compressor wheel held at another end of said shaft. The turbine wheel is placed in the exhaust gas flow of the engine, so that the compressor wheel is driven in rotation through the mechanical shaft. The compressor wheel is placed in the intake duct of the engine, to compress the intake gases before their injection into the engine. The speed of rotation of the turbocharger can then reach very high speeds, of the order of 250,000 rpm. That way, a poor balance between the mechanical shaft and the turbine wheel is liable to generate vibrations, which might cause noise pollution as a whistle as well as a premature wear of the turbocharger.

Usually, the turbine wheels are cast parts, whose raw surface does not permit the accurate welding thereof to the end of a mechanical shaft. Moreover, during the welding, the filling metal distribution on the welded part is not either well controlled. The axis of rotation of the mechanical shaft is hence more or less offset with respect to the centre of inertia of the welded part.

For that reason, it is necessary to control the value of this offset or imbalance called out-of-balance for each welded part, in order to make sure that this value is effectively comprised in the tolerance ranges predefined by the turbocharger manufacturers. In the opposite case, a balancing operation is implemented. This operation consists in removing a small quantity of material from the turbine wheel, in order to bring the axis of inertial of the welded part closer to the axis of rotation of the mechanical shaft. The material removal is made automatically, using a digital template of the part, operable to model, as a function of the out-of-balance value, the quantity of material to be removed, the removal shape as well as the location thereof on the turbine wheel. These information is then transmitted to a robot arm, for the latter to perform this removal using a grinding disk.

Now, the raw surface of the turbine wheels does not permit a very accurate control of their inclination angle with respect to the axis of rotation of the mechanical shaft during their welding. This inaccuracy results in an offsetting of the turbine wheel surface by a few tenths of millimetres with respect to its theoretical position when held by a base. In other words, the digital template does not take into account the existence of the so-called backlash phenomenon, relating to the variation of the inclination angle of the turbine wheel with respect to the mechanical shaft. As a function of the backlash amplitude, the quantity of material really removed by the robot arm varies more or less with respect to that which is desired. Hence, the result of a balancing significantly varies from a welded part to another according to the value of its backlash. A check of the out-of-balance value is performed after each balancing. In case the balancing would be insufficient, the balancing operation is reproduced until the out-of-balance value of the welded part is in line with the expectations. These repeated balancing operations have for drawback to slow down the production rate of said parts, and to a lesser extent, to weaken the structure thereof.

The present invention aims to solve this problem, by proposing a more accurate method for balancing the out-of-balance of a shaft-wheel assembly, comprising a bladed wheel held at the end of a mechanical shaft.

OBJECT OF THE INVENTION

For that purpose, the present invention proposes a method for balancing the out-of-balance of a shaft-wheel assembly, comprising a bladed wheel held at the end of a mechanical shaft, implementing the following steps:
  a) measuring the out-of-balance value of the shaft-wheel assembly with respect to a longitudinal axis of the mechanical shaft;
  b) measuring the position of at least two distinct target areas present at the surface of the bladed wheel; then
  c) removing a quantity of material at the surface of the bladed wheel, to reduce the out-of-balance value of the shaft-wheel assembly, as a function of the measurements made at steps a) and b).

In other words, the balancing method proposed by the invention takes into account the real position of the surface of the bladed wheel, before performing a removal of material at the surface thereof. By measuring the position of a few points at the surface of the bladed wheel, with respect to a longitudinal axis of the mechanical shaft for example, before the implementation of step c), the invention makes it possible to take into account the inclination as well as the real position of the bladed wheel with respect, par example, to the mechanical shaft on which the bladed wheel is welded. That way, the invention allows a much better control of both the location and the quantity of material really removed at the surface of the bladed wheel. In other words, the difference between the desired quantity of removed material and the really removed quantity of material, due to a phenomenon of backflash and/or offset between the bladed wheel and the mechanical shaft, due to a certain inaccuracy during their assembly, is significantly reduced. That way, the balancing of a shaft-wheel assembly is performed in a far more accurate manner with respect to the state of the art. This advantageously makes it possible to reduce the number of balancing cycles of a turbine wheel welded at the end of a mechanical shaft to meet the expectations of the turbocharger manufacturers.

It is to be noted that step b) can be performed at the same time as, before or after step c), and step a) consists in measuring the distance between the centre of inertia of the shaft-wheel assembly and the axis of rotation of the mechanical shaft.

According to another feature of the invention, the positions of the target areas are measured with respect to the position of the mechanical shaft. This embodiment is particularly advantageous when the shaft-wheel assembly is moved between steps b) and c). According an alternative embodiment, the positions of the target areas are measured with respect to a means for holding the mechanical shaft.

According to another feature of the invention, the target areas are present on one or several faces of the bladed wheel, extending radially or substantially radially with respect to the mechanical shaft. The surfaces extending radially to the mechanical shaft are favoured, so as to obtain more accurate information about the amplitude value of the backlash phenomenon.

According to another feature of the invention, the target areas are present on a same face of the bladed wheel. This embodiment advantageously makes it possible to sound several points of a same face, in order to detect potential surface defects linked, for example, to the bladed wheel manufacturing and/or handling method. In other words, the invention makes it possible, in particular, to detect and take into account defects linked to the mould used to make the bladed wheel.

According to another feature of the invention, the target areas are spaced from the mechanical shaft by an identical or substantially identical distance. This embodiment is particularly advantageous to measure the value of the backlash between the bladed wheel and the mechanical shaft.

According to another feature of the invention, the target areas are spaced from the mechanical shaft by a distance between 0.7 and 0.99 times the value of the largest radius of the bladed wheel. It is to be noted that the largest radius defines the largest circle inscribed or substantially inscribed in the bladed wheel. In other words, when the wheel includes openings between its blades, the largest radius of the bladed wheel stops at a web delimiting the deepest opening. This embodiment allows a more accurate measurement of the out-of-balance value between the bladed wheel and the mechanical shaft. According to another feature of the invention, the position measurements are made at at least four target areas.

According to another feature of the invention, the target areas are spaced apart by an identical or substantially identical angular distance with respect to the mechanical shaft. This embodiment allows an overall measurement of the bladed wheel backlash value. According to an alternative embodiment, a part of the target areas can be grouped at the level of the material removal that is desired to be made. This embodiment allows a more accurate calculation of the material that has to be removed to correct the out-of-balance value of the part.

According to another feature of the invention, the material removal is made in or near a target area. This embodiment allows a more accurate removal of a quantity of material.

According to another feature of the invention, the positions of the target areas are measured by means of a tool applied against the surface of the bladed wheel. Preferably, the tool is a means for grinding the bladed wheel, which is active during the measurement of the target area positions. This embodiment advantageously allows a more accurate detection of the position of the target areas, when the grinding means is slightly off-centred with respect to its axis of rotation. According to another advantage, the required balancing time is reduced by suppression of a step of activating the grinding means during the method.

According to another feature of the invention, the positions of the target areas are measured using contactless measurement means. By way of example, the contactless measurement means may include optical detection means and/or electromagnetic detection means. Preferably, the contactless measurement means are present at a station of measurement of the out-of-balance value of the shaft-wheel assembly.

According to another feature of the invention, previously to the removal step and from the target area position measurements, the method implements a step of calculating the inclination and/or the position of the bladed wheel with respect to the mechanical shaft, so as to define both the shape and the depth of an area of material removal to be made at the surface of the bladed wheel.

According to another feature of the invention, the material removal at the surface of the bladed wheel is made using a grinding tool, taking into account the position of the target areas during the moves thereof near the surface of the bladed wheel. In other words, the invention proposes to modify the grinding tool programmed stroke as a function of the curvature variations calculated from the positions of the target areas.

Of course, the different features, variants and embodiments mentioned hereinabove may be associated with each other according to various combinations, insofar as they are not incompatible with each other or exclusive from each other.

The invention also proposes a station for the automated balancing of the out-of-balance of a shaft-wheel assembly, adapted to hold a mechanical shaft integral with a bladed wheel, configured to implement one of the automated balancing methods described hereinabove, and comprising:

- means for measuring the out-of-balance value of a shaft-wheel assembly with respect to a longitudinal axis of the mechanical shaft; and
- means for measuring the position of several distinct target areas present at the surface of the bladed wheel; and
- means for removing a quantity of material at the surface of the bladed wheel, as a function of the position of several target areas at the surface of the bladed wheel.

According to another embodiment of the balancing station, the means for measuring the position of several target areas and the removal means are present at a same station. Preferably, the means for measuring the position of several target areas comprise a tool adapted to come into contact with the bladed wheel to measure the position of the target areas. According to a particular embodiment, the tool includes a grinding means, preferably active during the target area position measurements.

According to another embodiment, the removal means are of the grinding type, milling type or equivalent.

According to an alternative embodiment of the balancing station, the means for measuring the out-of-balance value and the means for measuring the position of the target areas are present at a same station. Preferably, the measurement means are of the contactless type. By way of example, the contactless measurement means can comprise optical detection means and/or electromagnetic detection means.

DESCRIPTION OF THE FIGURES

The following description in relation with the appended drawings, given by way of non-limitative examples, will allow a good understanding of what the invention consists of and of how it can be implemented.

DETAILED DESCRIPTION OF AN EXEMPLARY EMBODIMENT

Figure 1:
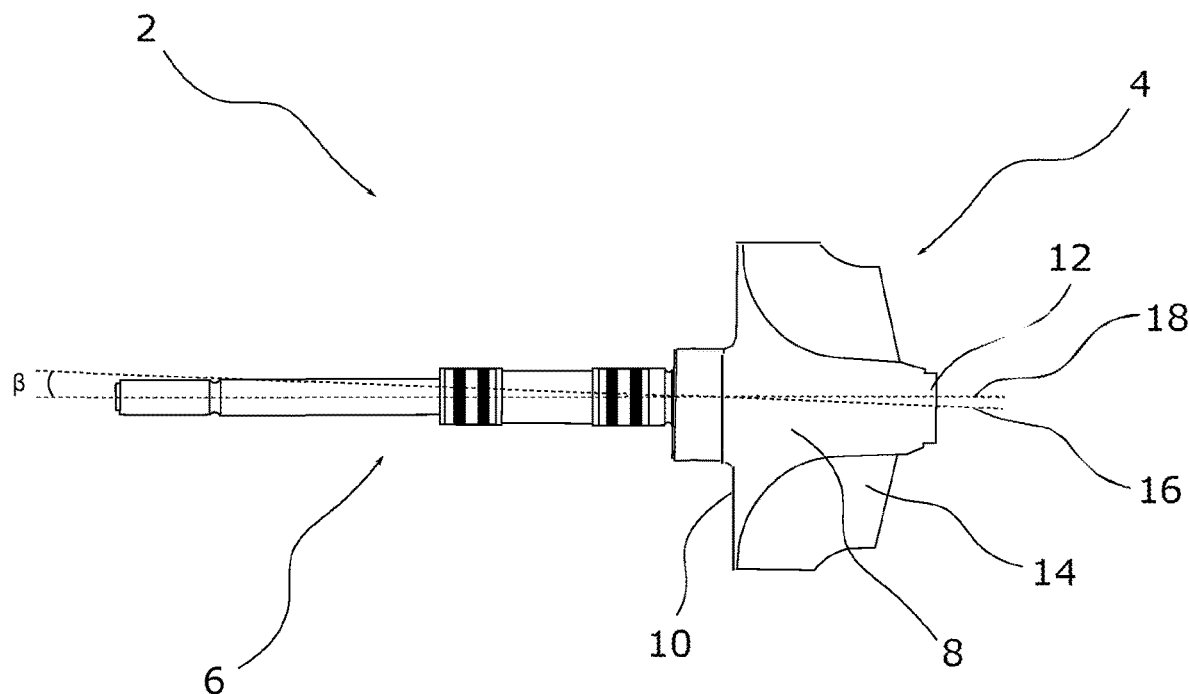
FIG. 1 is a schematic view of a longitudinal cross-section of a shaft-wheel assembly comprising a bladed wheel welded to the end of a mechanical shaft.

According to the invention, it is meant by shaft-wheel assembly 2, a bladed wheel 4 held at the end of a mechanical shaft 6, as illustrated in FIG. 1. As known, a bladed wheel comprises a hub 8 of conical or substantially conical shape, extending between a rear face 10 and a nose 12. The bladed wheel includes a plurality of wings 14 extending radially from the hub 8. The wings are distributed at regular intervals about said hub, so as to enable a flow of air to make the bladed wheel 4 pivoting about an axis of rotation 16, passing through the centre of the rear face 10 and the centre of the hub nose 12.

The bladed wheel 4 is usually a casted part whose raw surface prevents an accurate welding of the latter on one end of the mechanical shaft 6. That way, the axis of rotation 16 of the bladed wheel and the axis of rotation 18 of the mechanical shaft 6 are slightly offset with respect to each other and inclined by an angle $\beta$ as illustrated in FIG. 1. The centre of inertia 19 of the welded part is hence remote from the axis of rotation 18 of the mechanical shaft 6, see FIG. 2, which generates mechanical vibrations and a premature wear of the shaft-wheel assembly 2 when the latter is used as a turbocharger turbine. The present invention proposes a more accurate method for balancing the out-of-balance of the shaft-wheel assembly 2, with respect to the state of the art, in order to remedy these drawbacks.

According to a first exemplary embodiment, the balancing method according to the invention implements a first step of measuring the out-of-balance value of the shaft-wheel assembly 2, for example measuring the static out-of-balance value of the shaft-wheel assembly. As known, the offset between the centre of inertia 19 of the shaft-wheel assembly 2 and the axis of rotation 18 of the mechanical shaft 6 is measured. In the case where the measured value is not comprised in a predefined tolerance range, the balancing method implements the following steps.

Figure 2:
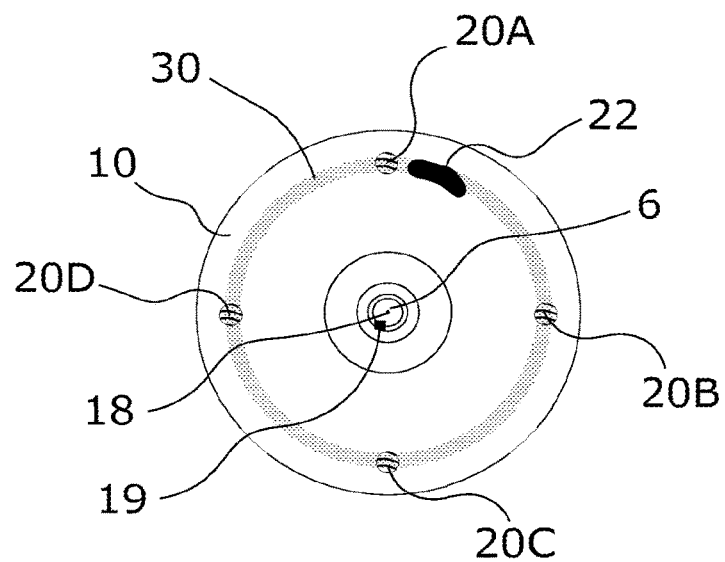
FIG. 2 is a schematic view of the bottom of the shaft-wheel assembly illustrated in FIG. 1, including several target areas present at the rear face of the bladed wheel.

According to a second step, the position of four distinct target areas 20A, 20B, 20C and 20D present on the surface of the bladed wheel 4, as illustrated in FIG. 2, is measured. More precisely, the four target areas are present on the rear face 10 of the hub 8. Each target area is spaced from the mechanical arm 6 by an identical or substantially identical distance between 0.7 and 0.99 times the radius R of the rear face 10, preferably of the order of 0.8 times the radius R of the rear face 10. It is to be noted that the radius R corresponds, according to the invention, to the radius of circle inscribed or substantially inscribed in the rear face and delimiting the latter. According to an alternative embodiment, when the bladed wheel includes openings between its blades, the radius R stops at a web delimiting the deepest opening at the rear face 10. Preferably, the position of the four target areas is measured with respect to the longitudinal axis 18 of the mechanical shaft 6.

According to an alternative embodiment, the position of the four target areas can also be measured with respect to a same reference system, distinct from the shaft-wheel assembly, for example with respect to a reference system linked to a device, adapted to make the shaft-wheel assembly pivot with respect to the axis of rotation 18 of the mechanical shaft 6.

The target areas 20A, 20B, 20C et 20D are spaced apart from each other by an identical or substantially identical angular distance $\alpha$, with respect to the axis of rotation 18 of the mechanical shaft 6. According to the present example, the value of this angular distance $\alpha$ is of the order of 90°. It is to be noted that the invention is not limited to the number of target areas, nor to the value of the angular distance mentioned hereinabove. For example, a part of the target areas can be located at the area in which it is desired to make a material removal.

According to a third step, from the measured positions of the target areas 20A, 20B, 20C and 20D, an angle of inclination of the rear face 10 of the hub with respect to the axis of rotation 18 of the mechanical shaft 6 is calculated. Thereafter, the value of this inclination angle is taken into account for calculating the correction of the out-of-balance of the shaft-wheel assembly 2, to determine the quantity of material to be removed, the location thereof as well as the shape of the material removal. The value of this inclination angle can for example be an adjustment variable of a digital template, used in a known manner to calculate and identify the area of material removal to be made. Preferably, the material removal area is calculated at the rear face 10, as close as possible of a target area.

Figure 4:
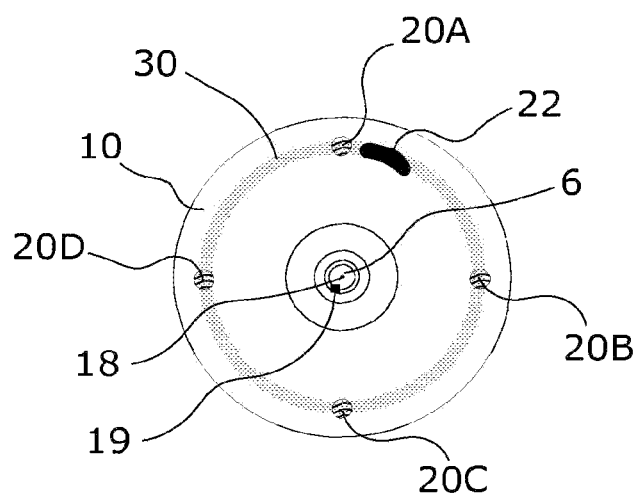
FIG. 4 is a schematic view of the bottom of the shaft-wheel assembly illustrated in FIG. 1, including a material removal area made in accordance with a balancing method according to the invention.

According to a fourth step illustrated by FIG. 4, a material removal 22 is made on the rear face 10 of the hub 8, in accordance with the previously made calculations, using of a grinding tool. This embodiment offers the advantage to calculate both a shape and a location of a material removal, in a far more accurate manner than the state of the art. Indeed, knowing the value of the inclination angle of the rear face 10 with respect to the mechanical shaft 6, the location as well as the quantity of material removed from said rear face are more accurately controlled.

The balancing method can include several alternative embodiments that will be described hereinafter. It is to be noted that these alternative embodiments do not aim to limit the scope of protection of the invention but, on the contrary, to show a part of the numerous possible alternative embodiments of the invention.

According to a first alternative of the exemplary embodiment described hereinabove, during the third step of identification of the material removal area 22, it is calculated, from the positions of the target areas 20A, 20B, 20C and 20D, a shape and location of the material removal area 22 on the bladed wheel so that the thickness thereof at said area is equal to or higher than a threshold value. The threshold value is chosen so as to preserve a certain mechanical strength to the bladed wheel 4. In other words, the method according to the invention makes is possible to avoid a too important material removal at the rear face 10, liable to weaken the mechanical strength of the bladed wheel, due to an uncertainty as regards the real position of the bladed wheel surface during the grinding operation. Preferably, the threshold value is chosen so that the thickness of the bladed wheel at the removal area, in a direction substantially parallel to its axis of rotation 16, is not lower than or equal to 0.5 mm, of preferably lower than or equal to 0.2 mm.

Figure 3:
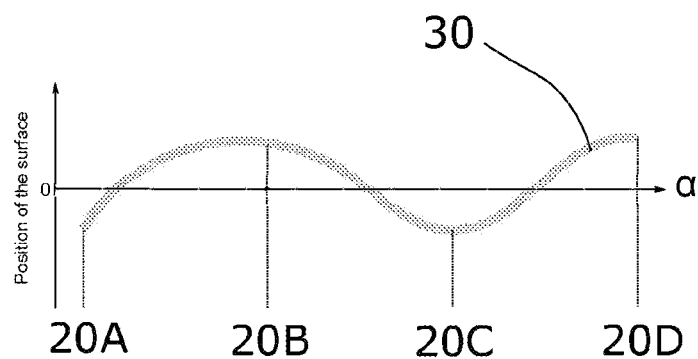
FIG. 3 is a modelling of the backslash of the rear face of the bladed wheel, calculated from the measurement of the positions of the target areas illustrated in FIG. 2.

According to a second alternative of the first exemplary embodiment described hereinabove, during the third step of identification of the material removal area, the measured positions of the target areas 20A, 20B, 20C and 20D serve to model the curvature of a perimeter 30 of the rear face 10 illustrated by FIG. 3. In other words, the number and positions of the target areas are chosen so as to be able to model the curvature or the backlash of at least a part of the rear face 10. It is to be noted that the perimeter can be partial and include only the parts of the rear face 10 that are liable to include the material removal area. In parallel, as known, the method identifies, from a digital template, a material removal area on the bladed wheel to reduce the out-of-balance value of the shaft-wheel assembly 2. In other words, both the location and the shape of the material removal area 22 are calculated independently from the target area position measurements. During the fourth step of the method illustrated in FIG. 4, a grinding tool is used to perform the material removal 22. As known, the grinding tool is moved using a robot arm, whose stroke is programmed as a function of the desired position and shape for the material removal area. According to the invention, the stroke of the grinding tool is modified in such a way as to take into account the curvature of the rear face 10, calculated from the positions of the target areas 20. In other words, the coordinates of the material removal area 22, transmitted to the robot arm, are modified in such a way as to take into account the real position of the surface of the rear face 10. This embodiment advantageously makes it possible not to modify the digital template, nor to modify the calculation of the shape and location of the material removal area 22 usually used by the state of the art. This alternative embodiment can hence be rapidly and easily adapted to the existing balancing methods.

According to a third alternative of the first exemplary embodiment described hereinabove, during the second step, the target areas 20 are chosen on a front face of the hub 8, opposite to the rear face 10 thereof (see FIG. 1). The front face 24 also extends radially or substantially radially with respect to the hub 8. The front face 24 can also delimit the blades 26. In this case, the material removal performed during the fourth step is preferably made at the front face 24, in order to allow a more accurate balancing.

According to a fourth alternative of the first exemplary embodiment described hereinabove, during the second step, a higher number of target areas is favoured, preferably between 4 and 20, when the surface of the bladed wheel includes irregularities, due for example to its manufacturing method and/or to collisions during its handing. Hence, advantageously, the balancing method can take into account this type of defect, in order to correct more accurately the out-of-balance value of the shaft-wheel assembly 2. The target areas are not necessarily distributed uniformly at the surface of the bladed wheel.

According to a fifth alternative of the first exemplary embodiment described hereinabove, during the second step, the positions of the target areas are measured with respect to a reference point present on the shaft-wheel assembly 2. By way of non-limitative example, this reference point can be a physical feature of the shaft-wheel assembly, such as a free end of the mechanical shaft 6 or a wing of the bladed wheel 4. Potentially, the point of reference can be a colour mark applied on the bladed wheel. This embodiment is particularly advantageous when the shaft-wheel assembly 2 has to be moved to perform the fourth grinding step.

According to a sixth alternative of the first exemplary embodiment described hereinabove, the calculation of the shape and position of the material removal area 22 is made previously to the measurement of the position of the target areas 20. This embodiment advantageously allows favouring the measurement of target areas 20 located on and/or closer to the material removal area 22. Hence, the number of target areas 20 can be reduced and/or the accuracy of the material removal 22 is improved.

According to a seventh alternative of the first exemplary embodiment described hereinabove, not shown, the material removal 22 is made at the nose 12 of the hub 8.

Figure 5:
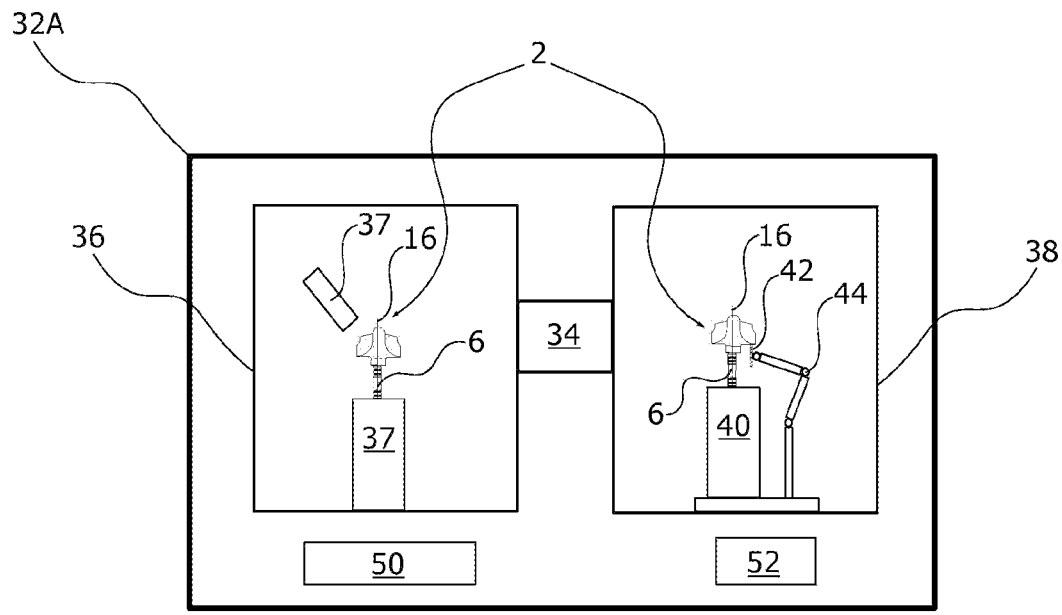
FIG. 5 is a schematic view of a longitudinal cross-section of a first embodiment of an automated balancing station according to the invention.

The present invention also relates to a station 32A for the automated balancing the out-of-balance of a shaft-wheel assembly 2, illustrated by FIG. 5, adapted to implement a balancing method as described herein above. For that purpose, the balancing station 32A includes a conveyor 34 for moving a shaft-wheel assembly 2 between a measurement station 36 and a grinding station 38.

The measurement station 36 includes means 37 for measuring the out-of-balance of a shaft-wheel assembly 2. The measurement station is controlled by a control unit 50, for measuring the distance between the centre of inertia 19 of the shaft-wheel assembly 2 and the axis of rotation 18 of the mechanical shaft 6, to obtain an out-of-balance value of said assembly.

The grinding station 38 comprises a support 40, adapted to hold the mechanical shaft 6 of a shaft-wheel assembly 2, while permitting the pivoting thereof about the axis of rotation 16 of said shaft. The polishing is made using a grinding disk 42, held at the end of an articulated arm 44. The articulated arm includes means adapted to detect a contact between the grinding disk 42 and the surface of the bladed wheel 4. In other words, the articulated arm 44 includes means for measuring by physical contact the position of several target areas 20 present on a bladed wheel, integral with a mechanical shaft held by the support 40. The grinding station is also controlled by the control unit 50 for allowing the removal of a quantity of material at the surface of the bladed wheel 4.

The control unit 50 includes means for storing a balancing method and calculation means not shown, operable to synchronize the measurement station 36, the conveyor 34 and the grinding station 38, in such a way as to automatedly implement a balancing method described hereinabove. The balancing station also includes an interface 52, in order to enable an operator to select and control a balancing method stored by the control unit 50.

Figure 6:
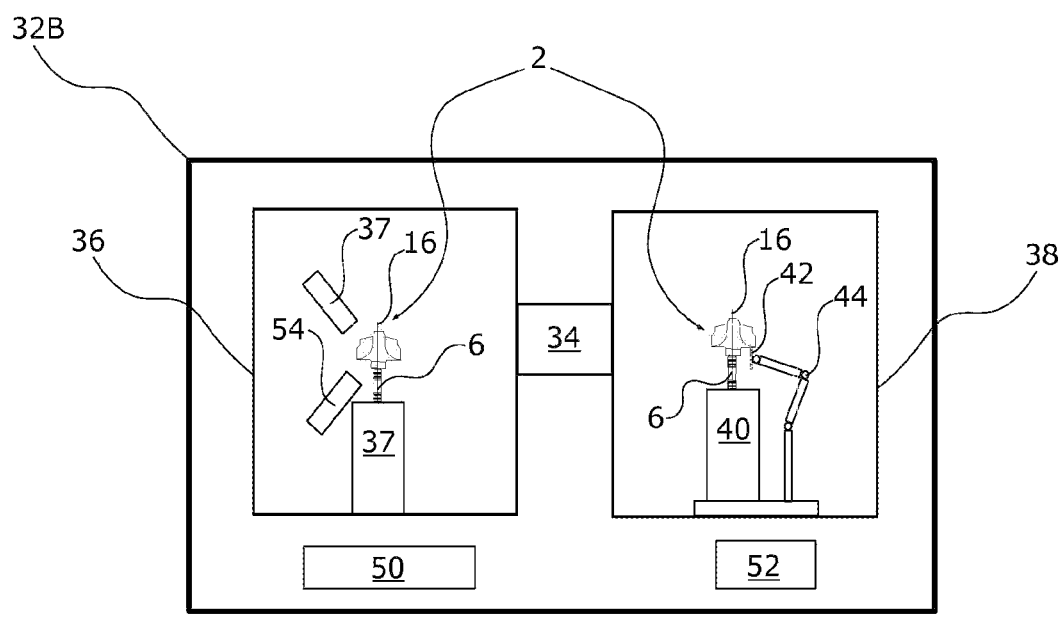
FIG. 6 is a schematic view of a longitudinal cross-section of a second embodiment of an automated balancing station according to the invention.

The balancing station is not limited to the embodiment described hereinabove. For example, according to an alternative embodiment illustrated by FIG. 6, the balancing station 32B includes contactless measurement means 54, adapted to measure the position of target areas 20 present at the surface of the bladed wheel. The contactless measurement means 54 are controlled by the control unit 50, so as to perform or complete the position measurements made by the articulated arm 44. These contactless measurement means 54 can be of optical nature, using for example a LASER distance sensor, or using an electromagnetic induction distance sensor. Of course, the invention is not limited to these only examples, so that the person skilled in the art can chose other types of sensors for performing these measurements. Preferably, the contactless measurement means 54 are present at the measurement station 36.

The invention claimed is:

1. A method for balancing the out-of-balance of a shaft-wheel assembly, comprising a bladed wheel held at the end of a mechanical shaft, implementing the following steps:
   a) measuring the out-of-balance value of the shaft-wheel assembly with respect to a longitudinal axis of the mechanical shaft;
   b) measuring the position of at least two distinct target areas, present at the surface of the bladed wheel, with respect to a longitudinal axis of the mechanical shaft; then
   c) removing a quantity of material at the surface of the bladed wheel, to reduce the out-of-balance value of the shaft-wheel assembly, as a function of the measurements made at steps a) and b).

2. The balancing method according to claim 1, wherein the target areas are present on one or several faces of the turbine wheel, extending radially or substantially radially with respect to the mechanical shaft.

3. The balancing method according to claim 2, wherein the target areas are present on a same face of the bladed wheel.

4. The balancing method according to claim 2, wherein the target areas are spaced from the mechanical shaft by an identical or substantially identical distance.

5. The balancing method according to claim 2, wherein the target areas are spaced from the mechanical shaft by a distance between 0.7 and 0.99 times the value of the largest radius of the bladed wheel.

6. The balancing method according to claim 1, wherein the target areas are present on a same face of the bladed wheel.

7. The balancing method according to claim 6, wherein the target areas are spaced from the mechanical shaft by an identical or substantially identical distance.

8. The balancing method according to claim 6, wherein the target areas are spaced from the mechanical shaft by a distance between 0.7 and 0.99 times the value of the largest radius of the bladed wheel.

9. The balancing method according to claim 1, wherein the target areas are spaced from the mechanical shaft by an identical or substantially identical distance.

10. The balancing method according to claim 1, wherein the target areas are spaced from the mechanical shaft by a distance between 0.7 and 0.99 times the value of the largest radius of the bladed wheel.

11. The balancing method according to claim 1, wherein the target areas are spaced apart by an identical or substantially identical angular distance with respect to the mechanical shaft.

12. The balancing method according to claim 1, wherein the material removal is made in or near a target area.

13. The balancing method according to claim 1, wherein the positions of the target areas are measured using a tool applied against the surface of the bladed wheel.

14. The balancing method according to claim 1, wherein the positions of the target areas are measured using contactless measurement sensors.

15. The balancing method according to claim 1, wherein, previously to the removal step and from the measurements of the positions of the target areas, the method implements a step of calculation of the inclination and/or the position of the bladed wheel with respect to the mechanical shaft, so as to define both the shape and the depth of the material removal to be made at the surface of the bladed wheel.

16. The balancing method according to claim 1, wherein the material removal at the surface of the bladed wheel is made using a grinding tool, taking into account the position of the target areas during the moves thereof near the surface of the bladed wheel.

17. A station for the automated balancing of the out-of-balance of a shaft-wheel assembly, adapted to hold a mechanical shaft integral with a bladed wheel, comprising:
   first measurement sensors configured to measure the out-of-balance value of a shaft-wheel assembly with respect to a longitudinal axis of the mechanical shaft, the first measurement sensors configured to measure an offset between a center of inertia of the shaft-wheel assembly and the longitudinal axis of rotation of the mechanical shaft to obtain the out-of-balance value of said assembly;
   second measurement sensors configured to measure the position of several distinct target areas present at the surface of the bladed wheel;
   a grinding or milling tool configured to remove a quantity of material at the surface of the blade wheel, as a function of the position of several target areas at the surface of the bladed wheel; and
   a processor programmed to determine the quantity of removal as a function of the measurements taken by the first and second measurement sensors to implement an automated balancing method comprising:
   a) using the first measurement sensors to measure the out-of-balance value of the shaft-wheel assembly with respect to the longitudinal axis of the mechanical shaft;
   b) using the second measurement sensors to measure the position of the at least two distinct target areas, present at the surface of the bladed wheel, with respect to the longitudinal axis of the mechanical shaft; then
   c) using the grinding or milling tool to remove the quantity of material at the surface of the bladed wheel, to reduce the out-of-balance value of the shaft-wheel assembly, as a function of the measurements made at steps a) and b).

18. The automated balancing station according to claim 17, wherein the second measurement sensors and the grinding or milling tool are present at a same station.

19. The automated balancing station according to claim 18, wherein the second measurement sensors comprise a tool adapted to come into contact with the bladed wheel to measure the position of the target areas.

20. The automated balancing station according to claim 17, wherein the first and second measurement sensors are present at a same station.

* * * * *